April 24, 1956

O. H. SCHMITT 2,743,408

MOTOR CONTROL

Filed July 4, 1944

Inventor
OTTO H. SCHMITT

By

Attorney

United States Patent Office 2,743,408
Patented Apr. 24, 1956

2,743,408
MOTOR CONTROL

Otto H. Schmitt, Port Washington, N. Y., assignor to the United States of America as represented by the Secretary of the Navy Application July 4, 1944, Serial No. 543,477

4 Claims. (Cl. 318—257)

This invention relates to control devices for electric motors and more particularly to a control device for direct-current motors having separately excitable field windings.

In many applications of direct-current motors, it is desirable to obtain proportional control of motor speed as a function of applied voltage over a wide range of speeds and with loads varying from no load to the full capacity of the motor. Heretofore, in the more effective systems of motor control for this purpose, the excitation for the motor field was maintained constant while the armature voltage was varied by a series rheostat to control the speed.

Motor control systems of this type were not entirely satisfactory, however, due to the fact that poor regulation resulted at low speeds. It can be shown, in general, that the E. M. F. applied to the armature must equal the back E. M. F. generated by the motor plus the E. M. F. required to overcome the sum of the external resistance in the armature circuit and the internal resistance of the motor. In addition, it may be shown that the torque developed by the motor is substantially proportional to the armature current. As pointed out above, the type of control previously used depended for its action upon varying the armature current by making suitable changes in the external resistance in the armature circuit, the lower speeds being obtained by increasing the magnitude of this resistance. Clearly, therefore, low speeds are accompanied by marked decreases in the armature current and consequently by appreciable decreases in the torque produced by the motor. Poor regulation thus becomes inevitable.

Reversal of the motor was effected, using control systems of the general type referred to above, either by substituting a center-tapped potentiometer for the series rheostat in the armature circuit or through the use of reversing switches. The first of these reversing methods results in the application of only one half the supply voltage to the armature circuit for operation in either direction, while the latter method requires the operation of two or more controls. It is an object of the invention, therefore, to provide a system of motor control such that low speeds may be obtained without appreciable reduction in the torque produced by the motor.

It is a further object of the invention to provide a system of motor control in which control of motor speed as well as direction of rotation is effected by means of a single control member without the necessity of doubling the supply voltage.

In view of the above, the invention provides in one aspect in a control device for direct-current motors having separate field windings, means for furnishing constant excitation to the field windings and means for applying excitation of variable amplitude and polarity to the armature of the motor, this last means comprising a resistance winding connected across a constant E. M. F., a pair of contactors arranged to move independently along the resistance winding, the armature of the motor being connected between the contactors, and means responsive to movements of a single control handle for so moving the contactors along the winding that they are at all times symmetrically disposed about the midpoint of the resistance winding.

Figure 1:
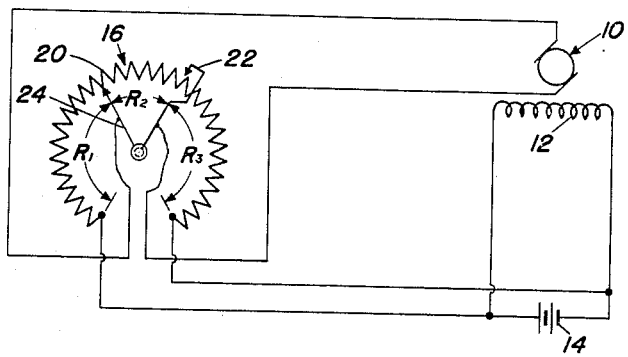
Fig. 1 is a circuit diagram of the motor control system of the invention.

As shown in Fig. 1 of the drawings, the field and armature circuits of motor 10 are provided with separate leads. Field winding 12 is supplied with excitation from a suitable source of direct-current potential shown in the drawings as battery 14. The armature leads are connected through a control device indicated generally at 16 to the same source of direct-current potential. Control of motor speed is effected using control device 16 which varies the E. M. F. applied to the armature circuit.

Figure 2:
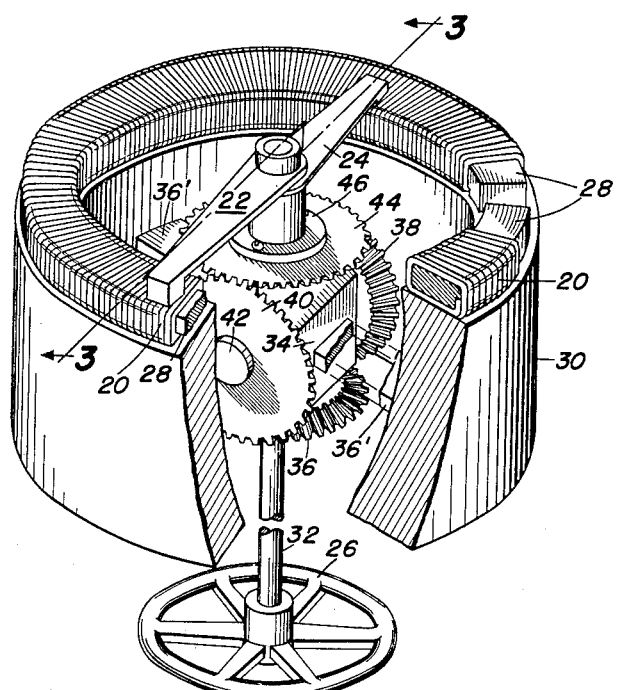
Fig. 2 is a perspective view showing the mechanical structure of the control device of the invention.

Referring to Figs. 1 and 2, it will be seen that control device 16 comprises a resistance winding 20, connected across battery 14 and a pair of contactors 22 and 24 between which is connected the armature of the motor. The mechanism to be described below is arranged in response to rotations of control handle 26 to rotate the contactors in opposite directions in such manner that they remain symmetrically disposed about the center of the resistance winding.

Because of the condition imposed upon the rotation of contactors 22 and 24, it will be seen that the portion of the total resistance R of resistance winding 20 indicated in Fig. 1 at $R_1$ must, at all times, be equal to the portion of the total resistance R indicated at $R_3$. Also as shown in Fig. 1, the resistance between the two contactors is that portion of the total resistance R indicated at $R_2$. It can be shown that, looking from the armature of the motor, the source impedance $R_s$ presented by the control device is substantially equal to the resistance $R_2$ in parallel with the sum of resistances $R_1$ and $R_3$, so long as the internal resistance of battery 14 is small compared with the total resistance R presented by resistance winding 20.

Since $R_1$ is at all times equal to $R_3$, $$R = R_2 + 2R_1 \qquad (1)$$

and $$R_s = \frac{2R_2 R_1}{R_2 + 2R_1} \qquad (2)$$

Substituting Equation 1 in Equation 2 and simplifying:

$$R_s = R_2 - \frac{R_2^2}{R} \qquad (3)$$

For low motor speeds the two contactors are brought close together to reduce the E. M. F. applied to the armature. At the same time $R_2$, the resistance between the two contactors, is reduced to a value much smaller than the total resistance R of resistance winding 20. Referring to Equation 3, it may be seen that the source resistance becomes essentially equal to $R_2$ under these conditions.

To increase the motor speed, the contactors are moved further apart, thus increasing the value of resistance $R_2$ and hence the applied E. M. F. It can be seen, however, that the source resistance $R_s$ increases much more slowly and in fact reaches a maximum when $R_2$ is equal to one half the total resistance R of the resistance winding.

Thereafter as the contactors are moved further apart, $R_2$ increases and eventually becomes equal to R. $R_s$ consequently decreases and becomes zero when $R_2$ equals R.

From the above it will be understood that R/4 represents the maximum external resistance in the armature circuit as seen from the armature of the motor. If then the total resistance R of resistance winding 20 is chosen to be approximately four times the internal resistance of the motor, the maximum external resistance in the armature circuit will be approximately equal to the internal armature resistance of the motor. The armature current is thus relatively large even at reduced speeds, resulting in improved regulation irrespective of the load on the motor.

Figure 3:
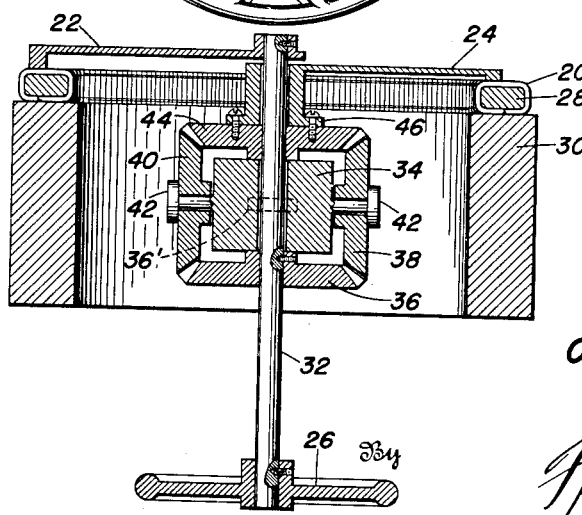
Fig. 3 is a sectional view taken along line III—III of Fig. 2.

One form of mechanism for producing the required movements of contactors 22 and 24 along resistance winding 20 in response to movements of the control handle is shown in Figs. 2 and 3. Resistance winding 20 is wound upon a circular core 28 (Fig. 3) which is mounted on cylindrical housing 30, this construction being similar to that used in conventional potentiometers. Control shaft 32 is journaled in block 34, supported by brackets 36' (Fig. 2) in such manner that shaft 32 is concentric with resistance winding 20. Control handle 26 is pinned to one end of shaft 32, while contactor 22 is pinned to the other end of the same shaft.

The rotation of contactor 24 is in such manner that it and contactor 22 are always symmetrically disposed about the center of the resistance winding. The rotation is accomplished by means of control handle 26 through a differential drive system. Thus bevel gear 36 pinned to control shaft 32 is arranged to engage bevel gears 38 and 40, journaled on shafts 42, supported by block 34. Bevel gear 44 is journaled on control shaft 32 in position to engage each of bevel gears 38 and 40, and contactor 24 is mounted on collar 46 and secured thereto. It will be understood that, due to the differential action of the gear system just described, clockwise rotation of bevel gear 36 will result in counterclockwise rotation of bevel gear 44 and vice versa. Thus if the system is initially assembled with contactors 22 and 24 symmetrically disposed about the midpoint of resistance winding 20, rotations of control handle 26 will cause the two contactors to move in opposite directions along the resistance windings, maintaining at all times the required condition of symmetry.

Conveniently and as shown in Figs. 2 and 3, contactors 22 and 24 are arranged to slide along opposite sides of resistance winding 20 and are so positioned in respect to the resistance winding that they may pass one another as they move along the winding. Thus it will be understood that as one of the contactors is moved from one end of the resistance winding to the other, the second contactor moves an equal distance along the winding but in the opposite direction, the crossover occurring at the center of the winding.

The control device may, therefore, be used not only as a speed regulator but also as a reversing control since the polarity of the E. M. F. applied to the armature circuit reverses as the contactors pass each other. Reversal of the motor is accomplished, therefore, without sacrificing torque at the lower speeds. In addition, it will be understood that the full supply potential may be applied to the motor for operation in either direction. The necessity for applying twice the maximum operating potential of the motor to the control potentiometer, as in previous control systems, is thus avoided.

Having thus described my invention, what I claim is:

1. In a direct-current variable-speed reversible motor having a variably energized armature winding and a constant energized field winding, operating means therefor comprising a source of constant potential, fixed connections between said field winding and said source, a voltage divider resistance connected across said source and formed into an arcuate coil, a pair of separate slidable contacts connected to the terminals of the motor armature winding, and a single rotatable control shaft directly connected to one of said contacts and drivingly connected to the other contact through a differential gear system for simultaneously wiping said contacts symmetrically over said resistance in opposite directions whereby the potential across said armature winding may be instantly varied between zero, when said contacts are alined at the midpoint of the resistance, and the full potential of said source, in either direction of polarity by correspondingly moving each of said contacts through less than 180°.

2. Apparatus for operating and for controlling the direction and speed of direct-current motors having separately excited field windings wherein greater torque is maintained at low speeds by increasing the armature current, said apparatus comprising a constant source of potential for the field windings, means for applying excitation of variable amplitude and polarity to the armature of the motor including a single control shaft, an annularly formed potentiometer resistance connected across said constant source of potential, a pair of rotatable contactor arms each having a contact connected to one of the armature terminals and mounted to be moved slidably along said potentiometer resistance, one of said arms being connected to said control shaft, the other arm being operatively connected to a differential gear system which is driven by said shaft, whereby the said arms are moved simultaneously in opposite directions along said resistance in response to rotation of said control shaft.

3. In a direct-current variable speed reversible motor having an armature and also having a field winding which winding is energized by a constant source of potential, a control device for applying excitation of variable amplitude and polarity to the armature of the motor, said control device comprising an arcuate resistance coil connected across the source of constant potential, a pair of contactor arms each having a contact connected to the armature and positioned for sliding movement along said resistance, said arms being superposed and rotatable about the center of curvature of the resistance coil, a differential gear system mounted at the center of curvature of said resistance coil and connected to one of said arms, a single control shaft connected to said differential and the other of said arms, such that rotation of said shaft moves the arms simultaneously and symmetrically in opposite directions along said resistance.

4. In a direct-current variable-speed reversible motor having an armature and also having a field winding which winding is energized by a constant source of potential, a control device for applying excitation of variable amplitude and polarity to the armature of the motor, said control device comprising an arcuate resistance coil mounted on a cylindrical housing, said resistance being connected across the source of constant potential, a pair of contactor arms each having a contact connected to the armature and positioned for sliding movement along said resistance, said arms being superposed and rotatable about the center of curvature of the resistance coil, a differential gear system mounted in the center of the cylindrical housing, said gear system comprising a polygonal block supported by the sides of the housing, a pair of vertically arranged bevel gears journaled on opposite sides of the block, a single vertically-arranged control shaft extending through said block and journaled therein, a horizontally-arranged bevel gear below said block and connected to said shaft, an upper horizontally-arranged bevel gear above said block and journaled on said shaft, said horizontal gears being in driving engagement with said vertical gears, one of said arms being directly connected to said control shaft and the other arm being connected to the upper surface of the upper bevel gear, whereby said arms are simultaneously moved in opposite directions along said resistance in response to rotation of said shaft.

(References on following page)

References Cited in the file of this patent

UNITED STATES PATENTS

| | | |
|---|---|---|
| 688,614 | Everst | Dec. 10, 1901 |
| 972,536 | Hubbard | Oct. 11, 1910 |
| 1,027,072 | Schwieder | May 21, 1912 |
| 1,042,444 | James | Oct. 29, 1912 |
| 1,682,541 | Schnabel | Aug. 28, 1928 |
| 1,993,720 | Nye | Mar. 5, 1935 |
| 2,363,132 | Lightfoot | Nov. 21, 1944 |

OTHER REFERENCES

"Electrical Engineering," vol. I, "Direct Currents" by Dawes, publisher McGraw-Hill Book Co., 1937 edition, pages 511–512.